Patented June 12, 1923.

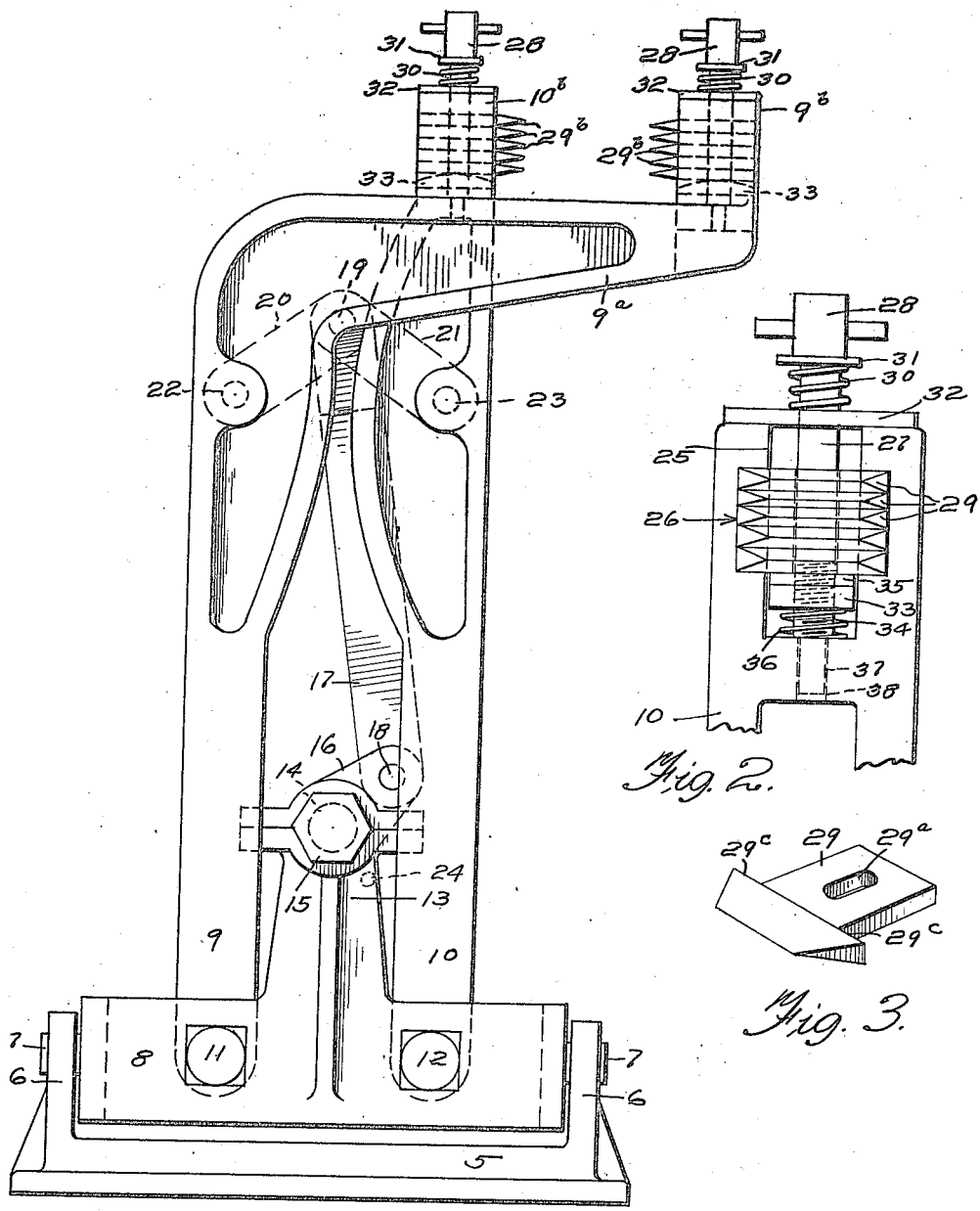

1,458,422

UNITED STATES PATENT OFFICE.

GOTTLIEB L. E. KLINGBEIL, OF OMAHA, NEBRASKA.

SPRING SPREADER.

Application filed September 7, 1922. Serial No. 586,775.

*To all whom it may concern:*

Be it known that I, GOTTLIEB L. E. KLINGBEIL, a citizen of the United States, residing at Omaha, in the county of Douglas and State of Nebraska, have invented certain new and useful Improvements in Spring Spreaders, of which the following is a specification.

This invention relates to spring spreaders and it has for its object to provide an improved device of this character adapted to separate the leaves of vehicle springs and particularly the leaves of automobile springs and to hold such leaves in separated condition as long as may be desired and without the necessity of the user maintaining a hold upon the spring spreading device in order to keep the leaves separated. This leaves the hands of the user free to work upon the springs whether the work to be done consists of lubrication, repair or otherwise.

In my copending application Serial Number 586,776, filed on the 7th day of September, 1922, I have shown a spring spreader embodying the above named characteristics. The present application is devoted particularly to the protection of a spring spreader adapted to act upon springs which overlie some other part, such, for example, as an axle. In some present well known and widely used makes of automobiles, the springs are disposed transversely of the vehicle and lie above the axle and it is an object of the present invention to provide a spring spreader the spring engaging part of which extends beyond the body of the structure in such manner that it may efficiently engage and spread the leaves of springs which overlie some other part.

Further objects and advantages of the invention will be set forth in the detailed description which now follows.

In the accompanying drawing:

Fig. 1 is a side elevation of a spring spreader constructed in accordance with the invention;

Fig. 2 is an end elevation of one of the jaws; and

Fig. 3 is a fragmentary perspective view illustrating one of the wedges and the bolt upon which it is mounted.

Like numerals designate corresponding parts in all of the figures of the drawing.

In the drawing 5 designates a bearing block having the upstanding portions 6 at the opposite ends thereof in which the trunnions 7 of a tilting block 8 are journaled. The lower ends of standards 9 and 10 are pivotally connected to the tilting block 8 at 11 and 12. The tilting block 8 carries bearing extensions 13, only one of which is shown, and within which a transverse shaft 14 is journaled. This shaft has an angular head 15 adapted to be engaged by any suitably shaped tool and turned, and said shaft carries a crank 16. A link 17 is pivotally connected at 18 with the crank and the upper end of said link is pivotally connected at 19 with toggle arms 20 and 21. The outer ends of these toggle arms are, in turn, pivotally connected at 22 and 23 with the standards 9 and 10, respectively. The upper portion of the link 17 is forked and the toggle arms 20 and 21 lie within said forked portion. When the crank 16 is moved to thrust the link 17 upwardly the toggle arms are thrown to an angle with respect to each other and the standards 9 and 10 are caused to move toward each other. Upon the other hand when the crank 16 is turned in such direction as to draw the link 17 downwardly, the toggle arms are drawn into alignment with each other and the standards 9 and 10 are thrust very forcibly apart and if this downward movement of the link 17 be continued until the toggle arms 20 and 21 move to slightly past center position, it will be seen that the standards 9 and 10 will remain in the position to which they have been moved without the necessity of further attention upon the part of the user. At about the time the toggle arms 20 and 21 reach the past center position a stop becomes effective to prevent these arms from moving further. This stop may be arranged at any desired point but for purposes of illustration I have shown a pin 24 disposed in position to limit the downward movement of the crank 16. However, it is to be understood that any desired form of stop may be used. The standard 9 is provided with a horizontal extension $9^a$ which projects beyond the standard 10 and this, in effect, crosses the standards with respect to each other so that movement apart of the body portions of the standards results in movement toward each other of the tops $9^b$ and $10^b$ of said standards. These top portions of the standards are bifurcated or vertically slotted, as indicated at 25, for the reception of interchangeable wedge assemblies indicated as a whole at 26. The reason for making these wedge assemblies interchangeable is that automobile springs vary in thickness and width. Thus, in order to take care of all types and makes of cars that may come to garages, the device must be so arranged that the proper wedge assembly may be quickly slipped into place, as required.

The wedge assemblies consist of bolts 27 provided with handle carrying heads 28 by which they may be manipulated. These bolts pass through a plurality of wedge elements 29 which have elongated openings through them extending longitudinally of said wedges and by virtue of which the said wedges are permitted to tip slightly in finding a seating in the grooves between the several leaves of a spring. A spring 30 bears between a collar 31 and a plate 32, said plate resting upon the upper end of the portion 9ª or 9ᵇ according to which of the standards the particular assembly is mounted upon. A plate 33 engages a threaded lower portion 34 of the bolt and this plate is provided with a rounded upper face 35 which engages the lowermost of the wedges and facilitates the tipping movement of the wedges in seeking their proper position of rest with their pointed ends 29ª engaged in the grooves between the several leaves of the springs to be spread. A spring 36 is preferably disposed between the under side of the plate 33 and the bottom of the slotted portion 25 of the standard. Thus the springs 26 and 36 permit the bolts and wedge assembly, as a whole, with the exception of plate 32, to be thrust downward in bringing about an initial or coarse adjustment of the wedges with respect to the leaves of the springs, the finer and accurate engagement being brought about automatically as the wedges individually seat themselves in proper position under the tendency of the points 29ᵇ to find entrance between the several leaves of the springs.

By virtue of the self locking arrangement provided by the toggle mechanism the spring will be held in its spread condition while being lubricated or otherwise worked upon and this without the necessity of the operator maintaining his hold upon the turning instrument by which movement is imparted to the crank 16.

The rearward thrust of the wedge elements 29 with respect to the portions 9ᵇ, 10ᵇ of the standards is taken by shoulders 29ᶜ formed upon said wedge elements. This relieves the bolts 27 of this rearward thrust and leaves as the sole duty of said bolts the task of maintaining the several elements in assembled condition so that they may be readily slipped into place as a unit when desired. To this end the lower portions of the bolts are reduced, as indicated at 37 for entry into corresponding openings 38 of the standards.

It is to be understood that the invention is not limited to the precise construction set forth but that it includes within its purview whatever changes fairly come within either the terms or the spirit of the appended claims.

Having thus described my invention what I claim is:

1. A spring spreader comprising a pair of standards, a base to which the lower ends of said standards are pivoted and by which said standards are held upright, mechanism for moving said standards toward and from each other, one of said standards carrying an extension which extends across the other of said standards, and spring-engaging wedges upon the upper ends of said standards.

2. A structure as recited in claim 1, wherein the mechanism for moving the standards toward and from each other comprises pivoted elements adapted to be moved to past center position in the movement of the standards toward each other to thereby automatically lock the standards in the position to which they are moved.

3. A spring spreader comprising a pair of standards, a toggle mechanism adapted to be moved to past center position for moving the standards toward each other, one of said standards carrying an extension which extends beyond the other of said standards to, in effect, cross said standards, and a plurality of spring-engaging wedge elements carried by the upper end of each of said standards.

4. A structure as recited in claim 3, wherein the spring-engaging wedge elements are bodily removable and replaceable as units.

5. A structure as recited in claim 3, in combination with a supporting base and a tilting block carried by said supporting base and upon which said standards are pivotally mounted.

6. A device of the character described, comprising a supporting base, a tilting block carried thereby, a transverse shaft mounted in said tilting block, a crank carried by said transverse shaft, a link pivotally connected to said crank, toggle links pivotally connected with the first-named link, standards pivotally mounted in the tilting block and to which the toggle links are directly connected, one of said standards carrying a horizontal extension which extends beyond the other of said standards, and said standards having upper portions which project above said horizontal extension, and spring-engaging wedge elements mounted in the upstanding portions of said standards.

In testimony whereof I affix my signature in the presence of two witnesses.

GOTTLIEB L. E. KLINGBEIL.

Witnesses:
ROSE L. SHAFTON,
MAUDE C. SHEPARD.